United States Patent [19]

Wagner

[11] Patent Number: 4,502,821
[45] Date of Patent: Mar. 5, 1985

[54] THREAD CUTTING TOOL

[75] Inventor: Rudolf Wagner, Stuttgart, Fed. Rep. of Germany

[73] Assignee: Rems-Werk Christian Föll und Söhne GmbH & Co., Waiblingen, Fed. Rep. of Germany

[21] Appl. No.: 526,136

[22] Filed: Aug. 24, 1983

[30] Foreign Application Priority Data

Aug. 25, 1982 [DE] Fed. Rep. of Germany ....... 3231538
Dec. 11, 1982 [DE] Fed. Rep. of Germany ....... 3245874

[51] Int. Cl.³ .......................... B23G 1/24; B23G 5/00
[52] U.S. Cl. ..................................... 408/124; 10/89 P
[58] Field of Search ........ 10/87, 89 R, 89 P, 107 PH; 408/124, 125, 107

[56] References Cited

U.S. PATENT DOCUMENTS

| 1,789,411 | 1/1931 | Oster et al. | 408/124 |
| 2,195,568 | 4/1940 | Hexdall | 10/89 P |
| 2,205,148 | 6/1940 | Mayotte | 408/124 |
| 2,678,453 | 5/1954 | Rudolph | 408/107 |
| 3,316,571 | 5/1967 | Cutrone | 408/105 X |
| 3,521,313 | 7/1970 | Baker | 408/124 |

Primary Examiner—E. Michael Combs
Attorney, Agent, or Firm—Becker & Becker, Inc.

[57] ABSTRACT

A thread cutting tool having an electric motor which is accommodated in a housing and, by means of at least one worm gearing, drives a holder ring which is rotatably mounted in a head ring. The electric motor has a speed of greater than 25,000 rpm. The worm-gear toothing of the holder ring has a modulus of less than approximately 1.6 mm. Due to the high speed, the electric motor can be very small, so that the thread cutting tool can be easily handled, and can have a low weight. Due to the low modulus, the high speed of the electric motor can be reduced to the operating speed of the holder ring without it being necessary that the worm gear have a large diameter.

27 Claims, 12 Drawing Figures 4,502,821

THREAD CUTTING TOOL

BACKGROUND OF THE INVENTION

The present invention relates to a thread cutting tool having a housing in which is accommodated an electric motor which, by means of at least one worm gearing, drives a holder ring which is rotatably mounted in a head ring and is provided with a worm-gear toothing in which at least one worm gear meshes.

Heretofore known thread cutting tools of this type have two handles, one of which is mounted on the housing of the drive motor, and the other of which is mounted on the outer side of the head ring. The electric motor has large dimensions and a relatively low speed. As a result, the thread cutting tool is very heavy, so that it is cumbersome to work with it, especially for longer periods of operation. The handling ability is also affected by the large dimensions of the motor housing. Since this heretofore known thread cutting tool has a weight of approximately 7 to 10 kg, it is too heavy to handle comfortably, so that the operator exhibits fatigue already after a short period of operation.

It is an object of the present invention to provide a thread cutting tool of the aforementioned general type which has a high output with low weight and small structural dimensions.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
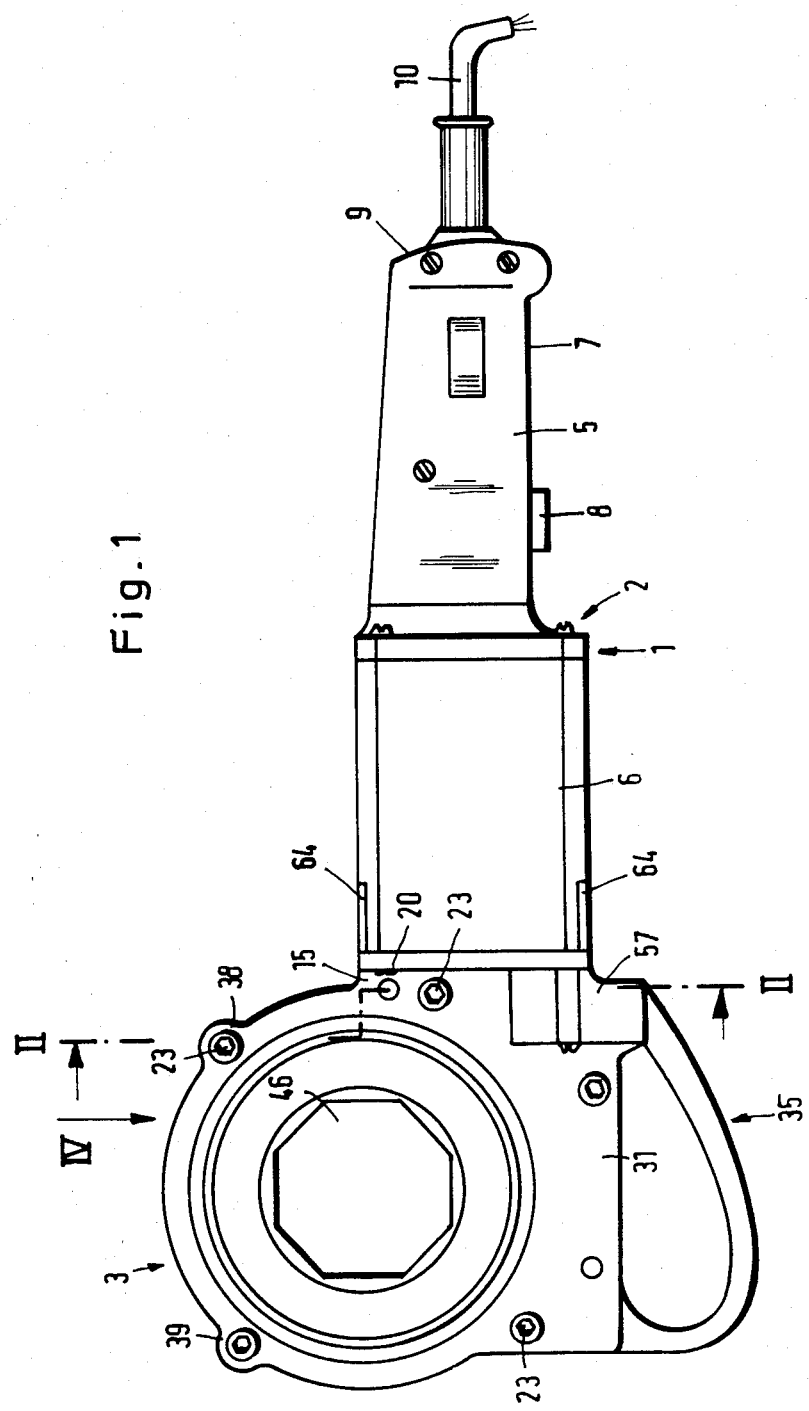
FIG. 1 is a side view of one inventive embodiment of a thread cutting tool.

The thread cutting tool of the present invention is characterized primarily in that the electric motor has a speed of greater than approximately 25,000 rpm, and in that the worm-gear toothing has a modulus of less than approximately 1.6 mm.

With the inventive thread cutting tool, the electric motor, due to the very high speed, can be made small, as a result of which not only can the handling ability be significantly increased, but the weight of the tool can also be significantly decreased. Since the worm gear drive has a modulus of less than approximately 1.6 mm, the high speed of the electric motor can be reduced to the desired working speed of the holder ring without the necessity that the worm gear have too large of a diameter. Due to the modulus of less than 1.6 mm, the worm gear has a relatively small diameter, so that despite the large reduction ratio, the overall size of the head ring is not increased. Also as a result of the low modulus, the weight of the head ring, and hence of the thread cutting tool itself, can be kept low. Due to its construction, the inventive thread cutting tool has a very high output, so that threads having a larger diameter can also be satisfactorily cut therewith. The weight of the inventive thread cutting tool is only approximately 4.0 to 5 kg, so that it can be comfortably carried by an operator even over longer periods of operation.

Pursuant to one extremely advantageous embodiment of the present invention, the housing of the head ring, at least on one end face as well as on the outer surfaces, is covered with a heat insulating material. With this inventive embodiment of the thread cutting tool, the heat insulating material prevents the head ring housing from getting too hot during operation, so that this housing can be readily grasped by the operator of the thread cutting tool even after an extended period of use. The heat insulating material, which covers the end face and the outer surfaces, also covers the separating line between the two parts of the housing of the head ring. A possibly resulting staggering of the joint at this separating line is covered by the heat insulating material so that it does not have to be machined. Edges or machining burrs on the end face and on the outer surfaces of the head ring housing also do not have to be machined as a result of the covering of heat insulating material. As a result, the manufacture of the inventive thread cutting tool is considerably simplified and made more economical. Furthermore, a sealing of the head ring housing is formed by the heat insulating material, so that no additional sealing is required.

The heat insulating material may be a synthetic material, especially an elastic synthetic material, preferably a thermoplastic material. The head ring housing may be provided with a handle which is covered with a heat insulating material that is preferably integral with the material which covers the head ring housing. The heat insulating material of the head ring housing and/or of the handle may have a constant thickness. The head ring housing may also be provided with flanges which project axially beyond the end faces of the head ring housing, with the heat insulating material on the end faces of the housing extending to these flanges.

Pursuant to further specific features of the present invention, the worm-gear toothing can have a modulus of approximately 1.0 mm. The speed of the electric motor can be approximately 30,000 rpm.

The head ring may have a housing, at least the greatest portion of the periphery of which is adapted to the contour of the holder ring. The tool may be provided with two handles, one of which is integral with the housing of the head ring, while the other is preferably formed by a portion of the housing of the electric motor. One of the handles, when viewed in the axial direction of the electric motor, may be approximately perpendicular to the other handle, relative to the periphery of the head ring; the two handles are preferably situated in a common plane.

A flange of the holder ring may slidingly rest on flanges of the housing of the head ring. The worm-gear toothing may be provided on a ring or collar of the holder ring, and is preferably axially disposed between, and rests against, the flanges of the housing of the head ring.

The housing of the electric motor may be provided with air outlet or ventilation openings, with the direction of flow of air discharging from these openings being at least approximately parallel to the axis of the head ring, and preferably diverging therefrom.

A further worm gear may be accommodated in the head ring and also meshes with the worm-gear toothing. The worm shafts associated with the worm gears may extend at right angles to one another and may be operatively connected with one another by means of a bevel gearing. The further worm gear, with the associated worm shaft, may be arranged in the region between the holder ring and the electric motor. A toothed-wheel gearing may be connected ahead of the worm drive, with the modulus of the gear wheels thereof being less than approximately 1.6 mm, and preferably approximately 1.0 mm.

The head ring housing may radially support the holder ring, with the flanges of the head ring housing preferably forming the radial support for the holder ring. The head ring housing may be provided with at least one axially projecting abutment piece which is radially spaced from the flanges and forms an axial support for the holder ring.

The electric motor may be provided with carbon brushes, the axes of which form an angle with the main field axis of a field winding; the carbon brushes may be adjusted relative to the field winding by means of an adjustment member which is preferably an adjustment ring which is rotatably mounted on the housing of the electric motor and can expediently be arrested in two end positions on the housing of the electric motor. The angle of brush rotation is approximately ±20°.

DESCRIPTION OF PREFERRED EMBODIMENTS

Referring now to the drawings in detail, the thread cutting tool shown in FIGS. 1–5 has a housing 1 in which is accommodated an electric motor 2, and has a head ring 3 in which cutting heads 4 (FIG. 3) can be inserted. The housing 1 for the electric motor 2 comprises two housing parts 5 and 6 which, when viewed in the longitudinal direction of the thead cutting tool, are disposed one after the other; the housing parts 5 and 6 are preferably detachably connected with one another. The housing part 5 is embodied as a grip or handle which can be comfortably grasped by the hand of the person operating the thread cutting tool. The housing part 5 has smaller outer dimensions than does the housing part 6, in which the non-illustrated stator and rotor of the electric motor are accommodated. A switch 8 is provided on the underside 7 of the housing part 5 (as viewed in the customary position of use of the thread cutting tool) for actuating the electric motor 2. As a result of this positioning, the switch 8 is automatically pressed with the entire hand when the housing part 5 is grasped. This manner of operation is particularly advantageous because the switch 8 is embodied as a snap or trigger switch which turns the electric motor 2 off as soon as the switch 8 is released. Due to this arrangement of the switch 8, the thread cutting tool can be operated over a long period of time without encountering fatigue. A connection lead 10 for the electric motor 2 is guided to the outside at that end face 9 of the housing part 5 which is remote from the head ring 3. Due to this arrangement, the connection lead 10 is spaced as far as possible from the head ring 3, so that there is no danger that during operation with the thread cutting tool the lead 10 inadvertently enters the region of the cutting head 4 which has been inserted into the head ring 3.

Since the two housing parts 5, 6 are detachably connected with one another, if the need arises, these two housing parts can be very easily replaced independent of one another.

Figure 2:
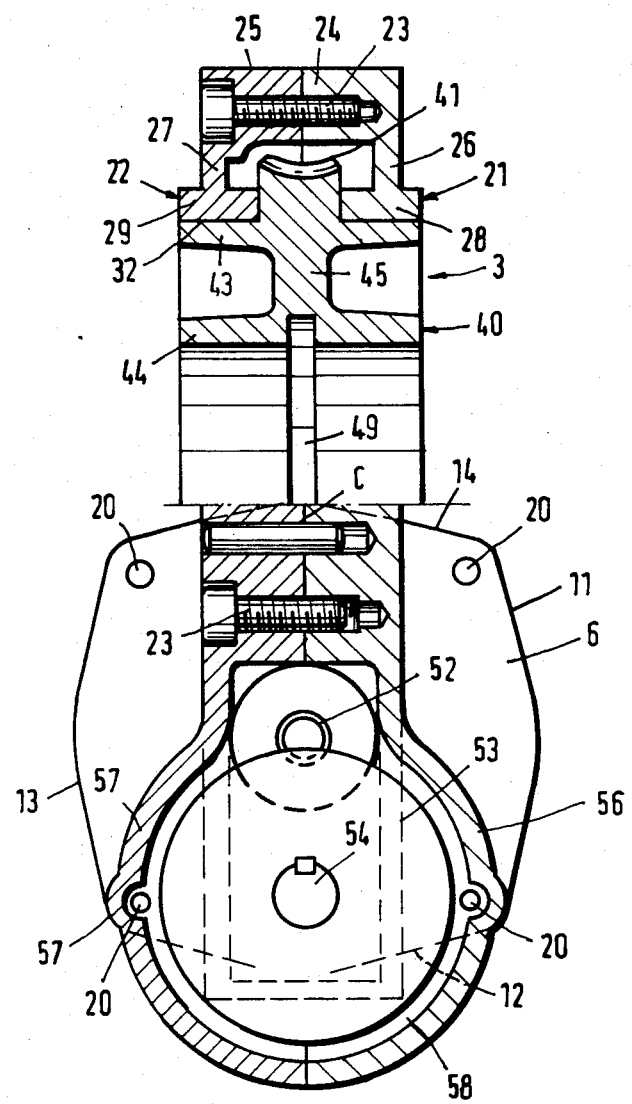
FIG. 2 is a section taken along line II—II in FIG. 1.

As shown in FIG. 2, the housing part 6 has an essentially rectangular cross section. The sectional sides 11–14 of the housing part 6 are each formed by two side sections which merge with one another at an obtuse angle and along a curve. Furthermore, the corners are rounded off. In this way, the housing part 6 has a very handy shape and a pleasing appearance.

Figure 5:
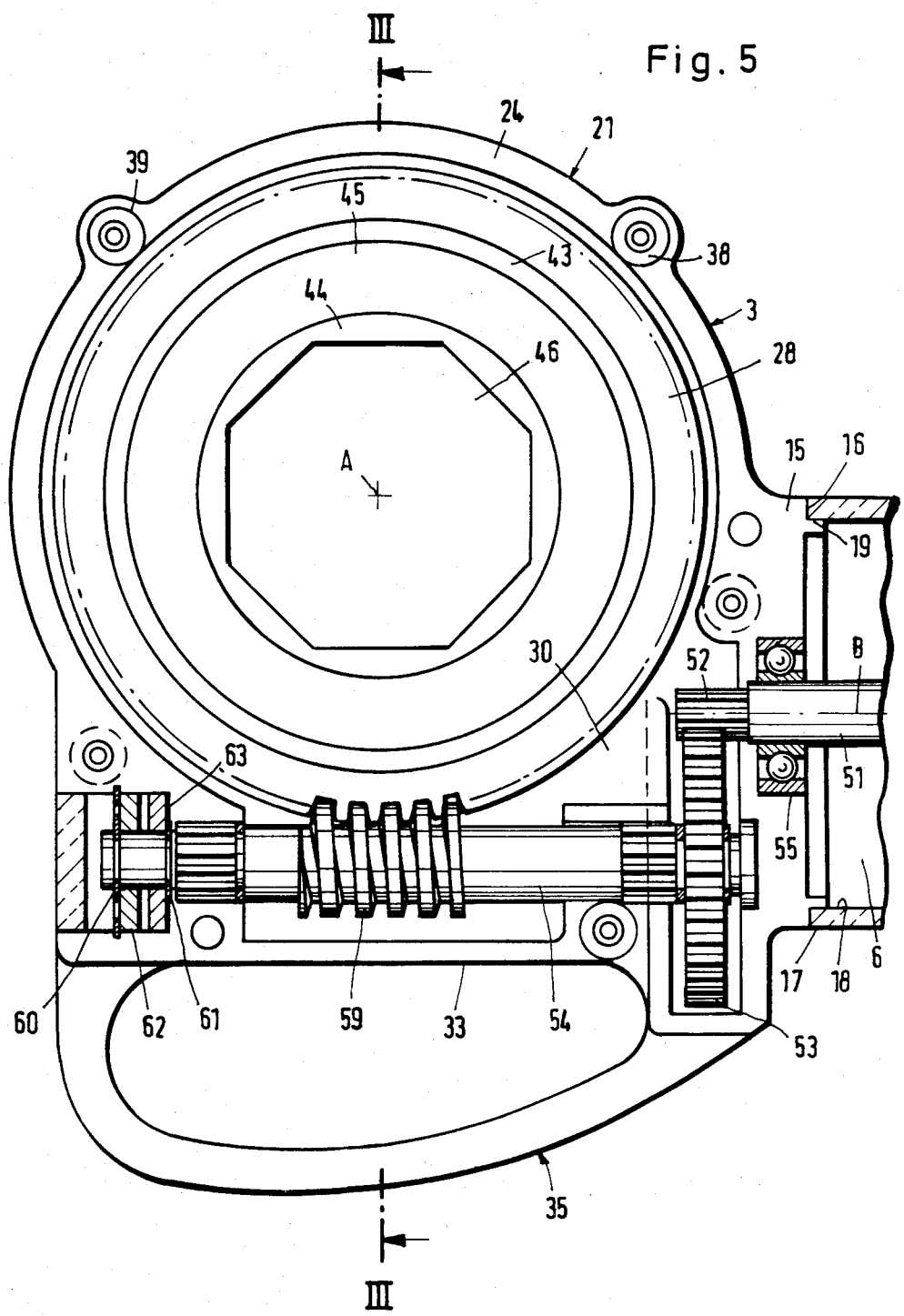
FIG. 5 is a section taken along line V—V in FIG. 4.

The housing part 6 is preferably detachably connected with the head ring 3, so that both parts can be easily replaced at any given time. As shown in FIG. 5, the head ring 3 is provided with an adapter piece 15 which has the same contour as does the housing part 6, so that no edge or the like is formed at the transition from the adapter piece 15 to the housing part 6. Along its outer edge, at its end face, the adapter piece 15 is stepped in such a way that a shoulder surface 16 is formed which is disposed radially relative to the axis of the housing part 6, and on which the front end 17 of the housing part 6 rests. In addition, the inner side 18 of the housing part 6, in the region of the front end 17, rests on an axially extending side surface 19 of the adapter piece 15. As a result, the housing part 6 can be very easily radially aligned relative to the head ring 3 during assembly. Respective screws 20 are provided in the corner regions of the adapter piece 15 and the housing part 6 in order to detachably innerconnect the housing part 6 and the head ring 3.

The head ring 3 comprises two housing parts 21, 22 which are essentially mirror symmetrically embodied; these housing parts 21, 22 are arranged in such a way that they are mirror symmetric to one another, and are detachably interconnected by means of screws 23 (FIG. 2). The two housing parts 21, 22 are dish-shaped, and have outer walls 24, 25 which are curved in the manner of a partial circle, and which extend nearly over an angular range of 180° (FIGS. 1 and 5). The outer walls 24, 25 are parallel to the axis A of the head ring 3. The front ends of the outer walls 24, 25 rest against one another (FIGS. 2 and 3), so that the head ring 3 has a closed surface. In that region curved in the form of a partial circle, the outer walls 24, 25 merge into radially extending annular wall sections 26, 27 (FIGS. 2 and 3), which are located in the end faces of the head ring 3 and connect the outer walls 24, 25 with respective flanges 28, 29. The flanges 28, 29 are axially disposed and project beyond the wall sections 26, 27 toward both sides. So that the head ring 3 is not very thick, the flanges 28, 29 only project slightly beyond the oppositely facing outer sides of the wall sections 26, 27, while in that direction directed toward one another the flanges 28, 29 project far beyond the wall sections 26, 27.

Figure 3:
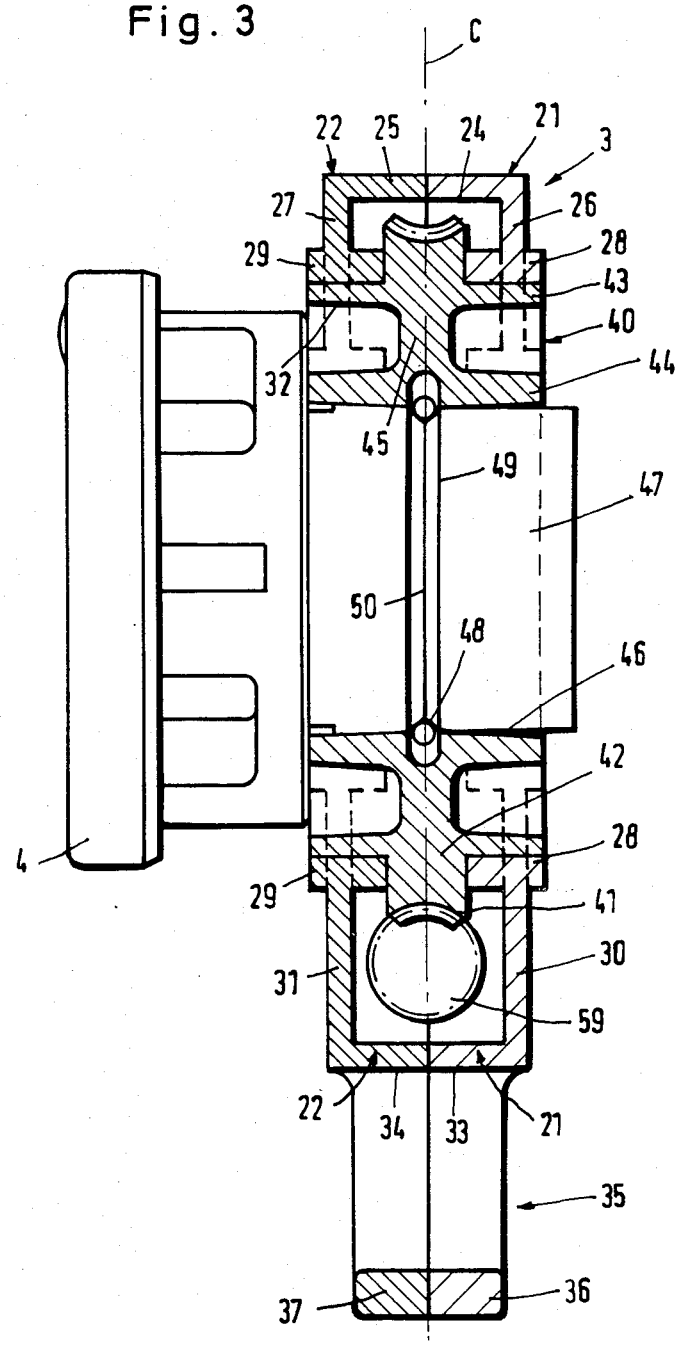
FIG. 3 is a section taken along line III—III in FIG. 5 through the head ring, into which a cutting head has been inserted.

As shown in FIG. 5, on that side facing the housing 1 of the electric motor 2, when viewed in the axial direction of the head ring 3 the outer walls 24, 25 extend in the manner of a partial circle to the level of the outer side of the housing. On that side remote from the housing 1, the outer walls 24, 25, when viewed in the axial direction of the head ring 3, extend in the manner of a partial circle approximately to the level of the axis B of the housing 1. The wall sections 26, 27 also extend annularly in this region, and then merge into a plate-like housing part 30, 31 respectively (FIGS. 1 and 5); the housing parts 30, 31 are disposed in the end faces of the head ring. As also shown in FIG. 3, the flanges 28, 29 extend annularly and define a circular receiving opening 32 for a holder ring 40. The flanges 28, 29 delimit the housing parts 30, 31 on that side facing the receiving opening 32. The outer walls 24, 25, which extend toward one another and are axially disposed, are provided over the entire periphery of the plate-like housing parts 30, 31, so that over the entire periphery of the head ring 3, the end faces of the two housing parts 21, 22 rest against one another and form a closed outer wall of the head ring. The plate-like housing parts 30, 31 have an essentially rectangular contour, and only that side thereof facing the receiving opening 32 is provided with a recess portion having the shape of a partial circle.

Those outer sides 33, 34 of the housing parts 21, 22 which face away from the receiving opening 32 extend in a planar manner and form a boundary for a handle 35. The handle 35 is a curved piece (FIGS. 1 and 5), and, when viewed in the operating position of the thread cutting tool, is disposed in the region below the head ring 3 and the housing 1. The handle 35 is also formed of two handle parts 36, 37 (FIG. 3), each of which is integral with the respective housing parts 21, 22 of the head ring 3. In the assembled state, the end faces of the handle parts 36, 37 rest against one another.

Figure 4:
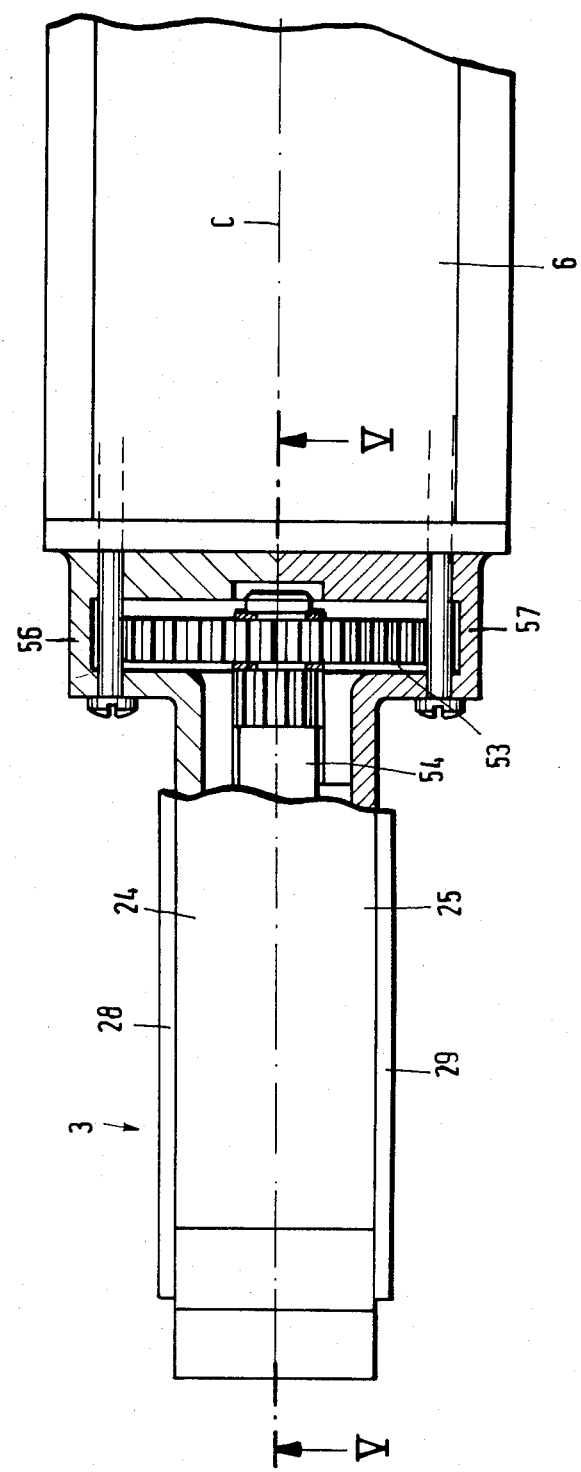
FIG. 4 is a partially sectioned view taken in the direction of the arrow IV in FIG. 1 and shows the drive connection between the electric motor and the head ring.

As shown in FIGS. 2, 3, and 4, the head ring 3 with the handle 35, and the housing 1 are essentially symmetrical to a common plane of symmetry C which extends at right angles to the axis A of the head ring 3. This results in a very favorable center of gravity of the thread cutting tool, thereby considerably simplifying handling thereof. Since the handle 35 of the head ring 3, and the housing part 5, which forms a second grip or handle of the thread cutting tool, are, pursuant to the described construction disposed symmetrically relative to the common plane of symmetry C, the thread cutting tool is suitable for either right handed or left handed operation.

So that the two housing parts 21, 22 of the head ring 3 can be rigidly connected with one another, the screws 23 are distributed over the periphery of the head ring 3, as shown in FIG. 1. So that the screws 23 can be accommodated in the relatively narrow rim of the head ring in the region of the partial circle configuration thereof, the housing parts 21, 22 are provided with eyes 38, 39 which project radially outwardly, have the shape of a partial circle, and are provided with the openings and threaded holes for the screws. The eyes 38, 39 project only slightly beyond the periphery of the head ring 3 so that the structural dimensions of the latter are only slightly increased due to the eyes.

The holder ring 40, which rotatably mounted in the receiving opening 32, is provided on its outer periphery with a worm-gear toothing (FIGS. 2 and 3). Preferably, the worm-gear toothing 41 is integral with the holder ring 40. The worm-gear toothing 41 is provided on a ring 42 which projects radially beyond the holder ring 40 and projects between the flanges 28, 29 of the housing parts 21, 22; the two outer sides of the ring 42 rest against the end faces of the flanges. This assures in a simple manner an axial securing of the holder ring 40 in the head ring 3. Furthermore, the worm-gear toothing 41 is in this way reliably shielded relative to the receiving opening 32, so that no dirt which is produced during the thread cutting can pass to the toothing. To radially secure the holder ring 40 in the head ring 3, the holder ring 40 is provided with a flange 43 which rests against the radially inner sides of the flanges 28, 29, with those end faces of the latter which are remote from one another being flush with the end faces of the flange 43. Since the head ring 3 is provided with the two housing parts 21, 22 which are detachably connected with one another, the holder ring 40 can be very easily mounted in the head ring 3 since it only has to be placed in one of the housing parts, with the other housing part being subsequently placed in position and fastened with the screws 20.

The holder ring 40 serves to receive the cutting head 4, and for this purpose is provided with a further, radially inwardly disposed flange 44 which is connected with the radially outer flange 43 by means of a web or cross piece 45 which is located approximately in the middle of the flange 44. The two flanges 43, 44 have the same width as do the flanges 28, 29 of the head ring 3, so that they do not project axially beyond the latter. The inner flange 44 has a polygonal receiving opening 46 (FIGS. 1 and 5), in which, as shown in FIG. 3, can be inserted in a fixed manner a corresponding polygonal plug-in connector 47 of the cutting head 4. In the inserted position, the cutting head 4 rests on the end face of the inner flange 44, while the plug-in connector 47 projects slightly beyond the opposite end face of the flange 44.

To axially secure the cutting head 4 in the receiving opening 46, a snap ring is provided as an arresting element 48 which is received in a peripheral groove 49 on the inner side of the flange 44. The peripheral groove 49 is embodied in such a way that the snap ring 48 projects slightly into the receiving opening 46 and can be pressed radially outwardly into the peripheral groove. When the cutting head 4 with its plug-in connector 47 is inserted into the receiving opening 46, the snap ring 48, under the effect of elastic deformation, is pressed radially outwardly into the peripheral groove 49, so that the plug-in connector 47 can be inserted. As soon as the cutting head 4 assumes its mounted position, the snap ring 48 springs into a peripheral groove 50 of the plug-in connector 47, as a result of which the cutting head 4 is axially secured in the receiving opening 46. The snap ring 48 makes it unnecessary to have parts which project laterally beyond the head ring 3, so that the width of the head ring is not increased as a result of the arresting element 48. In particular, there is no danger that parts which would otherwise project beyond the head ring 3 could lead during rotation of the cutting head to a considerable danger of accidents. Furthermore, the weight of the thread cutting tool is practically not increased at all as a result of the snap ring 48, so that the overall weight essentially remains the same.

The handle 35, in relation to the head ring 3, is disposed at approximately right angles to the housing part 5, which forms the second grip or handle for the thread cutting tool. Consequently, when the thread cutting tool is placed upon the pipe which is to be cut, and when it is forced there against, which is necessary for cutting the first thread, the tool is not pressed exactly in the axial direction, but rather is tilted slightly relative to the pipe. This has the advantage that the cutting head 4, while it is being pressed against the pipe, cannot be pressed out of the head ring 3, even though only the snap ring 48 is provided for the axial securing. Despite the simple arresting of the cutting head 4, this assures that the tool cannot be pressed out of the head ring during the cutting operation. After termination of the thread cutting, the cutting head 4 can be released in a simple manner from the head ring 3 by striking the thread cutting tool against a hard surface in such a way that the projecting plug-in connector 47 is pushed back. In so doing, the snap ring 48 is pressed back into the peripheral groove 49 of the flange 44, so that the plug-in connector 47 can be axially pushed out of the receiving opening 46.

The electric motor 2 accommodated in the housing 1 has a very high speed which is greater than approximately 25,000 rpm. Preferably, the electric motor 2 has a speed of approximately 30,000 rpm. Due to this high speed, the electric motor can be small, which not only enhances the handling of the thread cutting tool, but also considerably reduces its weight. This high speed must be reduced to the operating speed of the holder ring 40, or the thread cutting head 4, the operating speed of which is considerably less than the speed of the electric motor, and is approximately, for example, approximately 30 to 50 rpm. With a thread cutting tool, this reduction in speed is achieved in only two gearing steps. A drive shaft 51, which projects out of the housing part 6 through the adapter piece 15 into the head ring 3, carries a pinion 52 (FIG. 5), which meshes with an intermediate gear wheel 53 which is rigidly seated on a worm shaft 54. Within the adapter piece 15, the drive shaft 51 is rotatably supported in a bearing 55. The first gearing step, which is formed by the pinion 52 and the intermediate gear wheel 53, has a reduction ratio of approximately 6.5 to 7.5, preferably 7.2. The diameter of the intermediate gear wheel 53 is greater than the width of the head ring 3 (FIG. 2), yet less than the width of the housing part 6. In order to accommodate the intermediate gear wheel 53, the two housing parts 21, 22 are respectively provided in the region of the adapter piece 15 with a widened portion 56, 57 which is in the form of a partial circle. In the assembled state, the two widened portions 56, 57, the end faces of which rest against one another, define an essentially circular receiving chamber 58 for the intermediate gear wheel 53. The widened portions 56, 57 project slightly beyond the housing part 6 on the side of the handle 35 (FIGS. 1 and 2) and are symmetrically disposed relative to the plane of symmetry C. The intermediate gear wheel 53 has very little play in the receiving chamber 58, so that the diameter of the latter can be kept small. The size of this receiving chamber is such that the housing of the electric motor 2 can be mounted directly onto the adapter piece 15 without intermediate pieces.

On the worm shaft 54, which extends parallel to the undersides 33, 34 of the head ring 3, is seated a worm gear 59 which meshes with the worm-gear toothing 41. As shown in FIG. 3, the worm gear 59 is located in the space surrounded by the flanges 28, 29 and the housing parts 30, 31 of the head ring 3. The worm-gear toothing 41 and the worm gear 59 form the second gearing step, which has a reduction ratio of approximately 100 to 120, preferably approximately 109. An overall reduction ratio of approximately 800 is achieved with the two gearing steps 52, 53 and 41, 59, as a result of which the high speed of the electric motor 2 is reduced to the working speed of the holder ring 40. Since only two gearing steps are provided for the reduction, the weight of the thread cutting tool can be kept low, since only a few gearing parts are required. Since in the operating position of the tool the worm shaft 54 is disposed below the holder ring 40, a reliable supply of lubricant to the worm shaft is assured.

The modulus of the worm-gear toothing 41 and hence also of the worm gear 59 is less than approximately 1.6 mm and is preferably approximately 1.0 mm. Consequently, despite the high reduction ratio, the holder ring 40 can have a relatively small diameter, so that the structural dimensions of the head ring 3 can be kept very small. Furthermore, weight is saved in this way. The intermediate gear wheel 53 also has a relatively small diameter or a low modulus in order to be able to keep the diameter of this intermediate gear wheel small. The modulus m is calculated pursuant to the formula $m = t/\pi$, where t is the spacing, i.e. the distance between two adjacent similarly directed sides of the toothing, measured along the partial circle. The partial circle is defined as the sum of said spacing distances between said teeth located along a circle the perimeter of which is equal to $z \times t$, where z is the number of teeth of said worm gear toothed configuration. The modulus of the intermediate gear wheel 53 and of the pinion 52 is less than approximately 1.6 mm, preferably approximately 1.0 mm. At its free end, i.e. at that end remote from the intermediate gear wheel 53, the worm shaft 54 is axially secured by two retaining rings 60, 61 (FIG. 5), which are disposed on both sides of a bearing 62 in which the free end 63 of the worm shaft 54 is rotatably supported. The bearing 62 is accommodated in the housing parts 21, 22 in the vicinity of the undersides 33, 34 of the head ring 3.

To operate with the thread cutting tool, the desired cutting head is inserted into the holder ring 40. The holder ring 40 is embodied in such a way that conventional cutting heads can be inserted therein. Preferably, cutting heads can be used with which rods, tubes, pipes, and the like having a diameter of up to approximately 1¼ in. can be machined or processed. The given cutting head is axially secured in the holder ring 40 by means of the snap ring 48. The thread cutting tool is subsequently grasped at both handles 35, 5, and the cutting head 4 is placed upon the work piece. To begin cutting the thread, the thread cutting tool is pressed against the work piece in the manner previously described, whereby it is slightly tilted. By actuating the switch 8, the electric motor 2 is switched on which, via the described gearing, drives the holder ring 40 and hence the cutting head 4. As soon as the dies in the cutting head 4 have engaged the work piece, the thread cutting tool is automatically pushed upon the work piece during the thread cutting operation, with the operator merely having to apply a counter moment to the torque which results from the thread cutting. As soon as the switch 8 is released, the electric motor 2 is turned off and the holder ring 4 is stopped. The electric motor 2 has two turning directions, so that after termination of the thread cutting process the direction in which the cutting head 4 turns can be reversed and it can be backed off from the work piece.

Since the handle 35 is disposed in the region below the head ring 3, the thread cutting tool with the head ring 3 can be brought very close to a corner. As a result, pipes or the like which are located in a corner can be provided with threads without having to use additional tools. Since the contour of the housing parts 21, 22 is optimally adapted to the holder ring 40, these housing parts only project slightly radially beyond the cutting head 4, so that even pipes which are located very tightly in a corner region can still be cut with the thread cutting tool of the present invention. Furthermore, as a result of this configuration the dimensions of the head ring can be kept very small, which leads to a considerable saving in weight and enhances the handling of the thread cutting tool.

Since the cutting head 4 is axially secured in the head ring 3 by means of the snap ring 48, the cutting head can be inserted into the receiving opening 46 of the holder ring 40 from both sides. This has the advantage that both right handed and left handed threads can be cut with a single turning direction of the electric motor 2. Since as a result thereof the electric motor 2 must only apply a high torque in one direction, the carbon brushes (not illustrated) provided therein can be offset relative to these stator winding in the circumferential direction, i.e. a preferred direction of the winding is selected for positioning the carbon brushes. Due to this preferred direction, at a given speed of the electric motor 2 the output is increased in the corresponding direction. Since the cutting heads 4 can be inserted into the head ring from both sides, this high drive power can be used for cutting right handed and left handed threads. In the other direction of turning of the electric motor 2, which is necessary for backing the cutting head 4 off after the thread has been cut, the drive torque is correspondingly less. However, it suffices in every case for reliably backing the cutting head off from the work piece after termination of the thread cutting process.

Since the axis A of the head ring 3 is at right angles to the axis B of the electric motor 2, when the cutting head 4 is inserted the thread cutting tool only has a relatively small width.

As shown in FIG. 1, close to the adapter piece 15 of the head ring 3 the housing part 6 of the electric motor 2 is provided with ventilation openings 64. These ventilation openings are situated in that wall of the housing part 6 which extends parallel to the axis B of the electric motor 2. As a result, the air exiting from the ventilation openings 64 cannot pass into the cutting region, thus preventing the cutting oil, which is needed for the thread cutting operation, from being partially blown off again by the air exiting from the ventilation openings. This arrangement of the ventilation openings 64 has the further advantage that the cuttings cannot pass through the ventilation openings 64 into the interior of the electric motor 2 when the thread cutting tool is utilized above the head of the operator.

Figure 6:
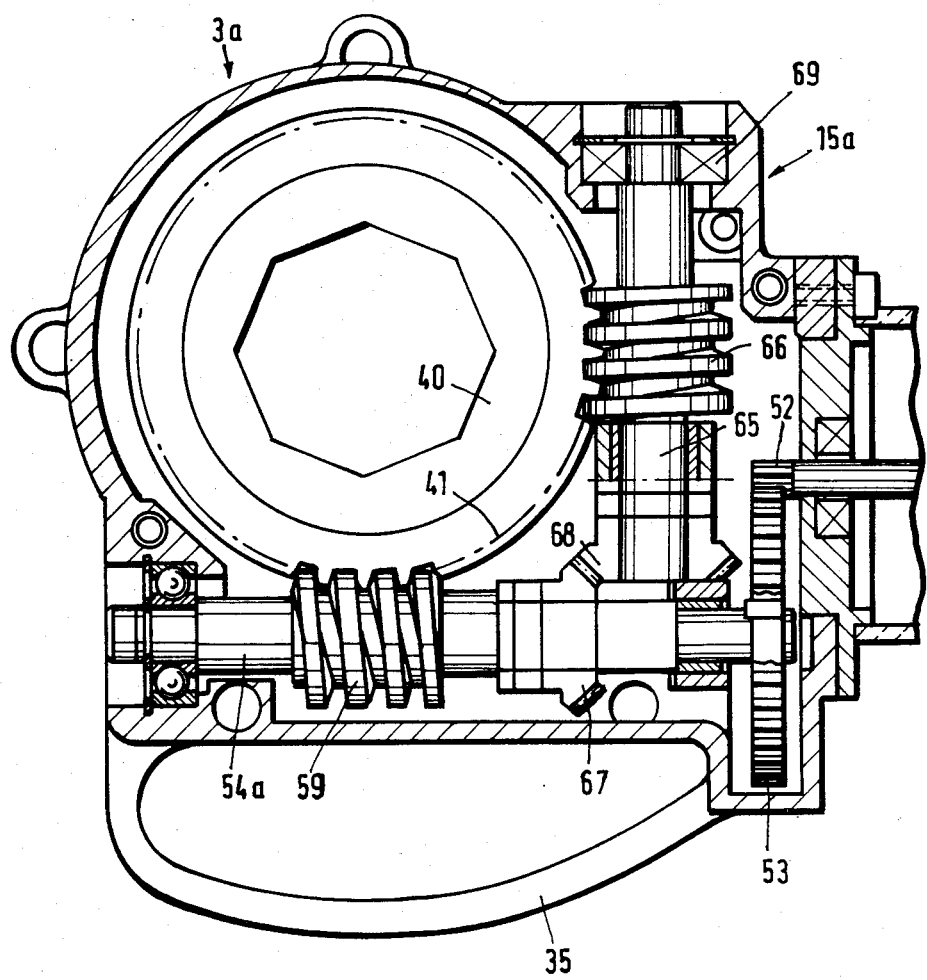
FIG. 6 is a view similar to that of FIG. 5 of a second embodiment of a head ring of the inventive thread cutting tool.

FIG. 6 shows a second embodiment of a thread cutting tool pursuant to the present invention. Essentially only those features which differ from the embodiment of FIGS. 1-5 will be described in the following. On that side remote from the handle 35, the adapter piece 15a is extended. As a result, the adapter piece 15a has larger dimensions than does the adapter piece 15 of the embodiment of FIGS. 1-5. A second worm shaft 65, which extends at right angles to the worm shaft 54a, is accommodated in the adapter piece 15a. A further worm gear 66, which meshes with the worm-gear toothing 41 of the holder ring 40, is fixedly seated on the worm shaft 65.

The drive shaft 51 projects into the adapter piece 15a of the head ring 3a. The pinion 52 of the drive shaft 51 meshes via radial toothing with the intermediate gear wheel 53, which is fixedly seated on the worm shaft 54a. In the region between the worm gear 59 and the intermediate gear wheel 53, the worm shaft 54a is additionally provided with a bevel gear 67 which is in engagement with a bevel gear 68 on the worm shaft 65. As a result, the two worm shafts 54a and 65 are driven from the drive shaft 51 by means of the bevel gearing 67, 68. The bevel gear 68 is seated on one end of the worm shaft 65, the other end of which is axially secured and rotatably supported in a bearing 69 in the adapter piece 15a. By using two worm gears 59, 66, a very high degree of overlap is achieved, so that the holder ring 40 with the wormgear toothing 41 and/or the two worm gears can be manufactured with large tolerances and therefore in an economical manner. The overall size of the thread cutting tool is only slightly increased relative to the size of the embodiment of FIGS. 1-5 by means of the second worm shaft 65 with the second worm gear 66. In other respects, the embodiment of FIG. 6 corresponds to that of the previously described embodiment. The embodiment of FIGS. 7 and 8 essentially corresponds to the embodiment of FIGS. 1-5. Therefore, only the differences will be described in the following paragraphs.

Figure 8:
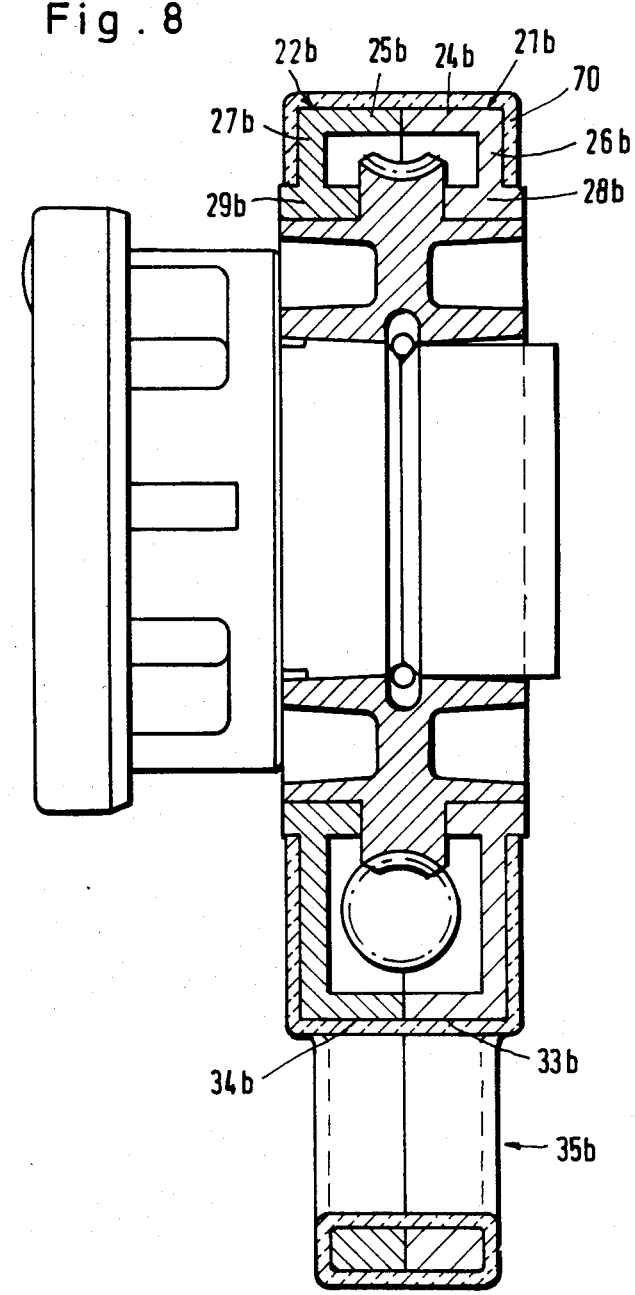
FIG. 8 is a section taken along line VIII—VIII in FIG. 7.

The two wall sections 26b, 27b which form the two end faces of the head ring 3b, as well as the outer walls 24b, 25b, are surrounded by a heat insulating material 70 which, as shown in FIG. 8, extends to the flanges 28b, 29b of the housing parts 21b, 22b. Furthermore, the handle 35b is also completely surrounded by the heat insulating material 70, which also covers the outer ends 33b, 34b of the housing parts 21b, 22b. The heat generated by the worm gearing, which is accommodated in the head ring 3b, during the use of the thread cutting tool is retained by the heat insulating material 70, so that even after working with the tool for a long uninterrupted period of time, the head ring 3b as well as the handle 35b can be easily held with the hand.

Preferably, the heat insulating material 70 is a heat insulating synthetic material which can be easily applied to the head ring 3b and the handle 35b. A thermoplastic material is preferably used as the heat insulating synthetic material; preferably, an elastic synthetic material is used which in addition to the heat insulating properties also has impact resisting properties. Should the thread cutting tool be roughly placed upon a surface or should it happen to fall on the floor, the impact would then be dampened by an elastic synthetic material in such a way that the head ring 3b would not be damaged. The heat insulating material which surrounds the handle 35b and the head ring housing 21b, 22b is preferably made in one piece so that it can be applied in a single step. Preferably, the heat insulating material of the head ring housing 21b, 22b and the handle 35b has a uniform thickness. However, it is also possible to apply a thicker heat insulating layer to the head ring housing 21b, 22b, because the worm gearing which generates the heat is accommodated in the head ring housing.

The housing 1b of the electric motor 2b generally already comprises heat insulating synthetic material, so that it is not necessary to further insulate it against heat.

However, it is of course also possible to surround the housing 1b with additional heat insulating material 70 which is preferably integral with the remaining heat insulating material.

Figure 7:
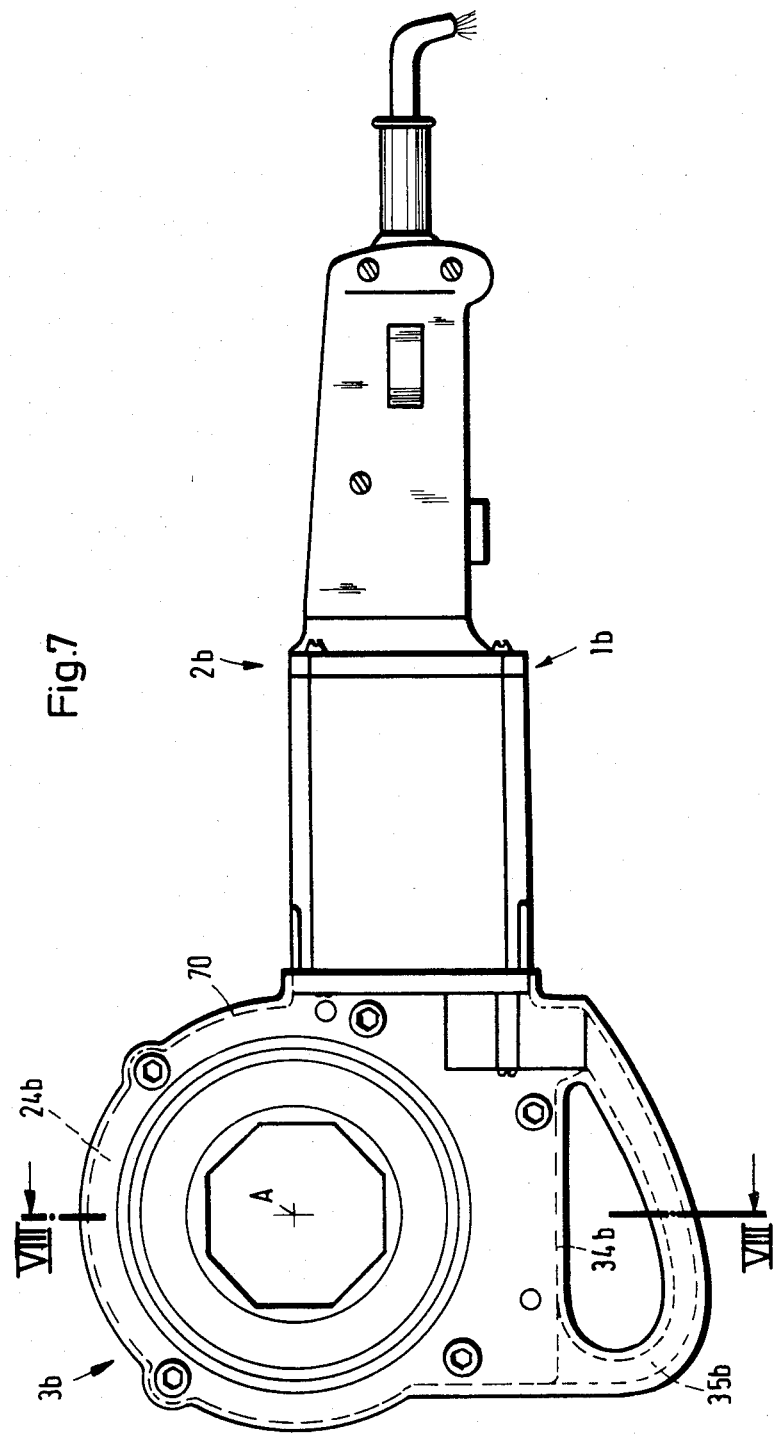
FIG. 7 is a side view of a further inventive embodiment of a thread cutting tool.
Figure 9:
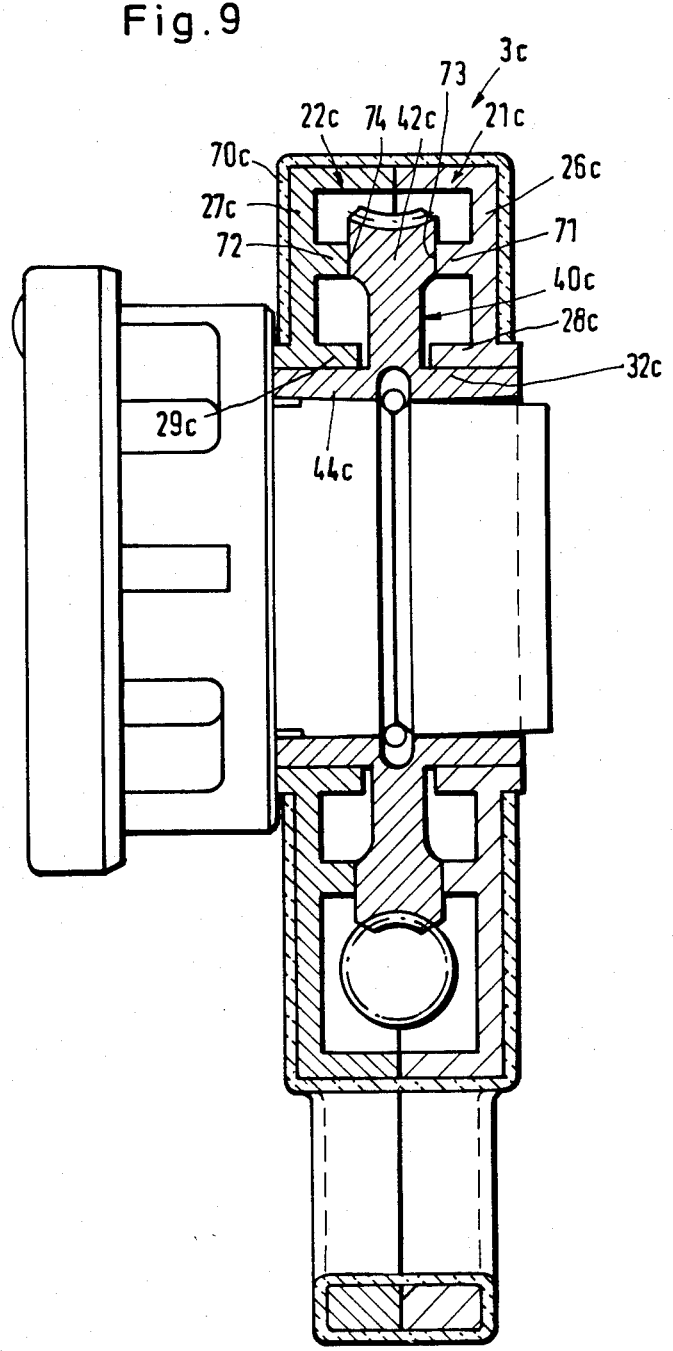
FIG. 9 is a view similar to that of FIG. 8 of a further embodiment of a thread cutting tool pursuant to the present invention.

The embodiment of FIG. 9 is essentially the same as the embodiment of FIGS. 7 and 8; therefore, only those features which differ therefrom will be described below. With this embodiment, the housing parts 21c, 22c from an axial and radial support for the holder ring 40c. On each of the radially extending wall sections 26c, 27c of the two housing parts, there is provided, approximately in the middle thereof, an abutment piece 71, 72 respectively which projects axially inwardly, and is embodied as a ring which extends coaxial to the receiving opening 32c; however, the abutment pieces 71, 72 could also be formed by parts which in the circumferential direction are spaced from one another. The ring 42c of the holder ring 40 rests against the end faces 73, 74 of the abutment pieces 71, 72. As a result, the holder ring 40c is axially supported on the abutment pieces 71, 72.

The holder ring 40c has only a single flange 44c which is located on the inner side of the flanges 28c, 29c of the housing parts 21c, 22c which define the receiving opening 32c. These annular flanges 28c, 29c form the radial support for the holder ring 40c. In contrast to the embodiment of FIGS. 7 and 8, the flanges 28c, 29c are axially spaced from the holder ring 40c, so that these flanges only form a radial support for the holder ring 40c. As a result of the described configuration of the housing parts 21c, 22c and the holder ring 40c, the holding parts are nearly completely covered toward the outside by the housing parts 21c, 22c. Merely the thin flange 44c of the holder ring 40c extends to the end faces of the head ring 3c. As a result, the heat insulating material 70c can be provided nearly to the receiving opening 32c, so that only a small part of the head ring 3c is not heat insulated. This assures an optimum heat insulation of the head ring 3c.

Figure 10:
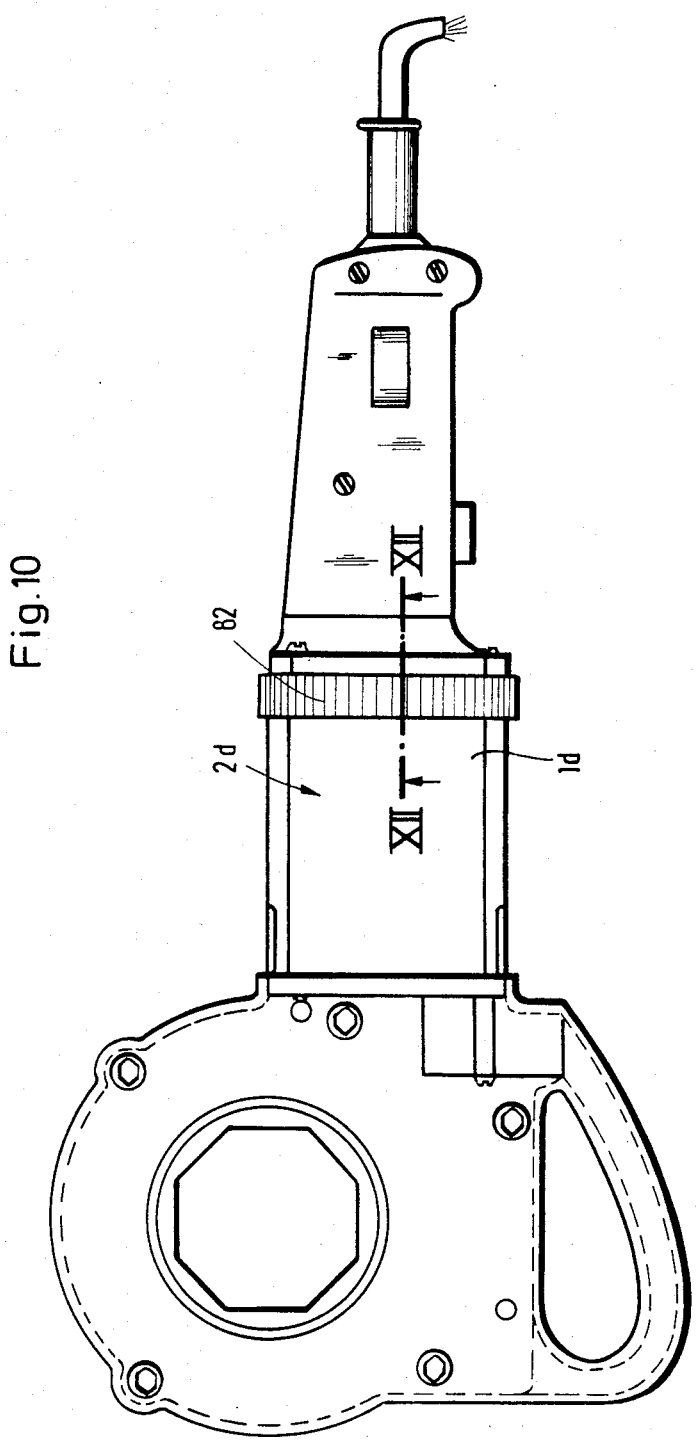
FIG. 10 is a side view of yet another inventive embodiment of a thread cutting tool.
Figure 11:
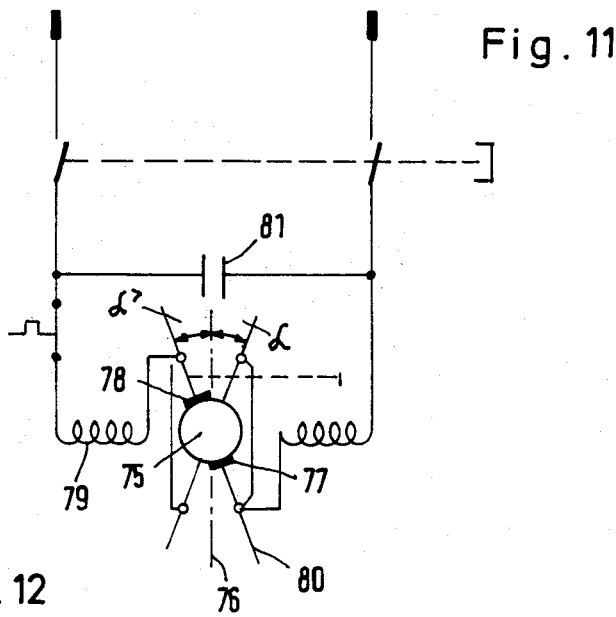
FIG. 11 is a schematic circuit diagram of a brush displacement of the electric motor of the inventive thread cutting tool of FIG. 10.
Figure 12:
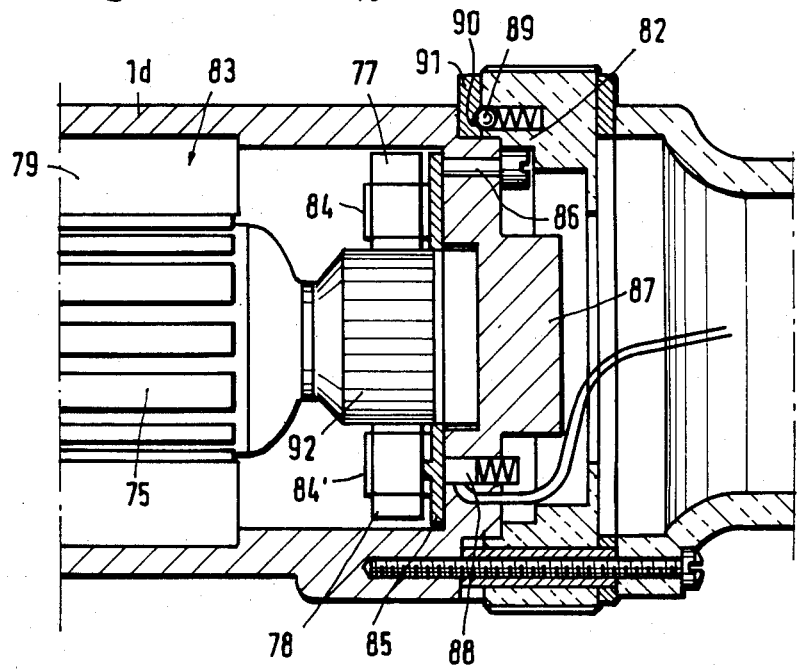
FIG. 12 is a section taken along line XII—XII in FIG. 10.

It is known with an electric motor which is embodied as a universal motor, in order to improve the output, to rotate the orientation of the axis of a carbon brush holder, and hence of the carbon brushes, relative to the field winding. FIGS. 10 to 12 show an embodiment according to which the carbon brushes 77, 78, depending upon the direction in which the electric motor 2d turns, can be rotated into various angular positions relative to the winding of a stator 83. FIG. 12 shows a rotor or armature 75 which is rotatable within the stator 83 with a stator winding 79, which is fixedly installed in the housing 1d of the electric motor 2d. Fixedly associated with the rotor 75 is a commutator 92 upon which the carbon brushes 77, 78 rest. The rotor 75 has a main field axis 76 (FIG. 11), while the axis of the brushes is designated by the reference numeral 80. If the brush axis 80 is at right angles to the main field axis 76, i.e. the angle of rotation α of the brushes is 0°, no induced electromotive force is effective between the brushes 77, 78. Therefore, no current flows, so that the electric motor 2d can develop no torque. If the brush axis 80 is oriented in the direction of the main field axis 76, the angle of rotation of the brushes is then 90°, so that although a current develops, no torque is generated, since the magnetic axes of the rotor currents lie in the same direction as the magnetic axes of the main flux. However, when the brush axis 80 is adjusted to an angle between these two extremes, a current is formed over the carbon brushes 77, 78, the magnetic axis of which in the rotor 75 has a component which is at right angles to the main field, and therefore generates a torque. It has been shown that the angle of rotation α of the brushes should be preferably be 20°, in order to obtain a maximum power output of the electric motor 2d. The stator winding 79 is connected to the power supply. A motor operating or running capacitor 81 is connected in parallel to the stator winding 79 (FIG. 11).

If the electric motor 2d is driven in a first direction, then the carbon brushes 77, 78 are rotated by the brush angle of rotation α relative to the stator winding 79. Since the thread cutting tool is to be used for cutting not only right handed but also left handed threads, the electric motor 2d must permit a clockwise and counterclockwise rotation of the cutting jaws or dies accommodated in the cutting head. So that a maximum power output of the electric motor 2d can be achieved in both directions of rotation, a carbon brush mounting means 84, 84' can be adjusted by means of an adjustment member 82 (FIG. 10). Preferably, the adjustment member 82 is formed by an adjusting ring which is rotatably mounted on the housing 1d of the electric motor 2d, and is provided with a knurling to make it easier to handle. By means of the adjustment member 82, by changing the direction of rotation of the electric motor 2d and hence of the worm gearing, the carbon brush mounting means 84, 84' can be turned in such a way that the brush axis 80 assumes the angle α or α' relative to the main field axis 76, depending upon which direction the electric motor is turning. The carbon brushes 77, 78 are connected via the brush mounting means 84, 84' with a plate 85 which is connected with the adjustment member 82 via screws 86 which pass through slots in the form of partial circles in a cover 87 of the housing 1d. The slots are of such a length that the adjustment member 82 with the screws 86 can be turned by an angle corresponding to the angle of rotation of the brushes. As a result of the rotation of the adjustment member 82, contacts 88 which are fixedly mounted in the housing 1d are connected with the commutator 92 via the carbon brushes 77, 78 in conformity with the position of the adjustment member. Two contacts are respectively provided for clockwise as well as countercloskwise rotation. In this way, the reversal of direction illustrated in FIG. 11 is achieved. In both end positions, the adjustment member 82 is secured by an arresting element 89 which is preferably formed by a ball which is under spring tension, is accommodated in the adjustment member 82, and in either end position engages in a respective depression 90 in a non-rotatably mounted disc 91 of the housing. If the brush axis 80 forms the angle α' with the main field axis 76, the power supply line is connected with the carbon brushes 77, 78 in such a way, and the electric motor 2d is driven in such a way, that a right handed thread can be cut upon the work piece. If a left handed thread is to be cut, the carbon brushes 77, 78 are turned by the adjustment member 82 until the brush axis 80 forms the angle α with the main field axis 76. The brush rotation angles α and α' are preferably approximately +20° or −20° respectively. Depending upon the construction of the electric motor 2d, naturally other brush rotation angles can also be provided in order to achieve the respective maximum power output of the electic motor.

The present invention is, of course, in no way restricted to the specific disclosure of the specification and drawings, but also encompasses any modifications within the scope of the appended claims.

What I claim is:

1. A thread cutting tool, which comprises:
a housing;
an electric motor which is positioned in said housing and has a speed of greater than approximately 25,000 rpm;
a head ring which is connected to said housing;
a holder ring which is rotatably mounted in said head ring, and which is provided with a worm-gear toothed configuration on its periphery having a modulus represented by the ratio of a spacing distance (t) divided by $\pi$, said spacing distance being defined as the distance between adjacent, similarly-directed sides of adjacent teeth of said worm gear toothed configuration and located along a partial circle defined as the sum of said spacing distances between said teeth, said partial circle lying on a circle having a circumference equalling the sum of said spacing distances times the number of said teeth (z), said modulus amounting to less than approximately 1.6 mm; and
at least one worm gearing means operatively connected with said electric motor and with said holder ring for driving the latter, said worm gearing means including at least one worm gear, each of which meshes with said worm-gear toothed configuration of said holder ring.

2. A thread cutting tool according to claim 1, in which said worm-gear toothed configuration of said holder ring has a modulus of approximately 1.0 mm.

3. A thread cutting tool according to claim 1, in which said electric motor has a speed of approximately 30,000 rpm.

4. A thread cutting tool according to claim 1, in which said head ring includes a housing, with at least the greatest portion of the periphery of said head ring housing being configured to the shape of the contour of said holder ring.

5. A thread cutting tool according to claim 1, in which said head ring includes a housing, and which includes two handles, one of which is integral with said head ring housing, while the other is formed by a portion of said housing for said electric motor.

6. A thread cutting tool according to claim 5, in which, when viewed in relation to the perhiphery of said head ring, and in the axial direction of said electric motor, said handles are disposed at right angles to one another and in a common plane.

7. A thread cutting tool according to claim 1, in which said head ring includes a housing which is provided with flanges; and in which said holder ring is provided with a flange which slidingly rests on said flanges of said head ring housing.

8. A thread cutting tool according to claim 7, in which said holder ring is provided with a collar, on which said worm-gear toothed configuration is provided; said collar is disposed between, and rests against, said flanges of said head ring housing.

9. A thread cutting tool according to claim 7, in which said head ring housing provides radial support for said holder ring.

10. A thread cutting tool according to claim 9, in which said flanges of said head ring housing form said radial support for said holder ring.

11. A thread cutting tool according to claim 9, in which said head ring housing is provided with at least one axially projecting abutment piece which is radially spaced from said flanges of said head ring housing, said at least one abutment piece forming an axial support for said holder ring.

12. A thread cutting tool according to claim 1, in which said housing for said electric motor is provided with ventilation openings which are disposed in such a way that air flow associated therewith is directed no closer than parallel to the axis of said head ring.

13. A thread cutting tool according to claim 1, in which said worm gearing means includes two worm gears positional in said head ring and meshing with said worm-gear toothed configuration of said holder ring.

14. A thread cutting tool according to claim 13, which includes two worm shafts, one connected with each of said worm gears, said worm shafts being disposed at right angles to one another; and which includes a bevel gearing for operatively connecting said worm shafts with one another.

15. A thread cutting tool according to claim 13, in which one of said worm gears, and the worm shaft thereof, is arranged between said holder ring and said electric motor.

16. A thread cutting tool according to claim 1, which includes a toothed-wheel gearing means interposed between said electric motor and said at least one worm gearing means; said toothed-wheel gearing means includes gear wheels having a modulus of less than approximately 1.6 mm.

17. A thread cutting tool according to claim 16, in which said modulus of said gear wheels of said toothed-wheel gearing means is approximately 1.0 mm.

18. A thread cutting tool according to claim 1, in which said head ring includes a housing, at least one end face, as well as the outer surface, of which is provided with a covering of heat insulating material.

19. A thread cutting tool according to claim 18, in which said heat insulating material is a synthetic material.

20. A thread cutting tool according to claim 19, in which said heat insulating material is an elastic thermoplastic material.

21. A thread cutting tool according to claim 18, in which said head ring housing is provided with a handle which is also provided with a covering of heat insulating material.

22. A thread cutting tool according to claim 21, in which said heat insulating cover of said handle is integral with said heat insulating cover of said head ring housing.

23. A thread cutting tool according to claim 22, in which said heat insulating cover of at least one of said handle and said head ring housing is of uniform thickness.

24. A thread cutting tool according to claim 18, in which said head ring housing is provided with flanges which project axially beyond the end faces of said head ring housing; and in which said heat insulating cover on said end faces of said head ring housing extends to said flanges.

25. A thread cutting tool according to claim 1, which includes a field winding having a main field axis; in which said electric motor is provided with carbon brushes having an axis which forms an angle with said main field axis; and which includes an adjustment member for adjusting the position of said carbon brushes relative to said field winding.

26. A thread cutting tool according to claim 25, in which said adjustment member is an adjustment ring which is rotatably mounted on said housing for said electric motor, said adjustment ring having two end positions; and which includes arresting means for arresting said adjustment ring relative to said housing in said two end positions.

27. A thread cutting tool according to claim 25, in which said carbon brush angle is approximately $\pm 20°$.

* * * * *